US011130066B1

(12) United States Patent
Robinson

(10) Patent No.: US 11,130,066 B1
(45) Date of Patent: Sep. 28, 2021

(54) SYSTEM AND METHOD FOR SYNCHRONIZATION OF MESSAGES AND EVENTS WITH A VARIABLE RATE TIMELINE UNDERGOING PROCESSING DELAY IN ENVIRONMENTS WITH INCONSISTENT FRAMERATES

(71) Applicant: Sonic Bloom, LLC, Cambridge, MA (US)

(72) Inventor: Eric D. Robinson, Cambridge, MA (US)

(73) Assignee: Sonic Bloom, LLC, Cambridge, MA (US)

( * ) Notice: Subject to any disclaimer, the term of this patent is extended or adjusted under 35 U.S.C. 154(b) by 1343 days.

(21) Appl. No.: 15/250,805

(22) Filed: Aug. 29, 2016

Related U.S. Application Data

(60) Provisional application No. 62/211,667, filed on Aug. 28, 2015.

(51) Int. Cl.
| | | |
|---|---|---|
| G06F 7/00 | (2006.01) |
| A63F 13/87 | (2014.01) |
| A63F 13/25 | (2014.01) |
| A63F 13/52 | (2014.01) |
| A63F 13/54 | (2014.01) |
| A63F 13/92 | (2014.01) |

(52) U.S. Cl.
CPC .............. *A63F 13/87* (2014.09); *A63F 13/25* (2014.09); *A63F 13/52* (2014.09); *A63F 13/54* (2014.09); *A63F 13/92* (2014.09)

(58) Field of Classification Search
CPC .......... A63F 13/87; A63F 13/25; A63F 13/52; A63F 13/54; A63F 13/92; H04N 21/8455; H04N 21/8547; H04N 21/4126; H04N 21/47217; H04N 21/85406
See application file for complete search history.

(56) References Cited

U.S. PATENT DOCUMENTS

| | | |
|---|---|---|
| 5,655,144 A | 8/1997 | Milne et al. |
| 5,951,646 A | 9/1999 | Brandon |
| 6,249,091 B1 | 6/2001 | Belliveau |
| 6,359,656 B1 | 3/2002 | Huckins |
| 6,404,438 B1 | 6/2002 | Hatlelid et al. |
| 6,408,274 B2 | 6/2002 | Tedd |
| 6,433,784 B1 | 8/2002 | Merrick et al. |
| 6,686,970 B1 | 2/2004 | Windle |
| 6,696,631 B2 | 2/2004 | Smith et al. |
| 6,737,957 B1 | 5/2004 | Petrovic et al. |
| 7,026,536 B2 | 4/2006 | Lu et al. |
| 7,301,092 B1 | 11/2007 | McNally et al. |
| 7,793,208 B2 | 9/2010 | Iampietro et al. |

(Continued)

FOREIGN PATENT DOCUMENTS

| | | |
|---|---|---|
| EP | 1276326 A2 | 1/2003 |
| WO | 2008024486 A2 | 2/2008 |

*Primary Examiner* — Azam M Cheema
*Assistant Examiner* — Mohammad A Sana
(74) *Attorney, Agent, or Firm* — Loginov & Associates, PLLC; William A. Loginov

(57) ABSTRACT

System and method that handles the inconsistent processing of interactive media (e.g. digital games, music visualization software, video playback software, animation software, etc.) and the generally consistent timeline delay to enable synchronization of messages and events with the playback of potentially variable-rate timelines.

15 Claims, 11 Drawing Sheets

(56) References Cited

U.S. PATENT DOCUMENTS

| | | |
|---|---|---|
| 8,006,186 B2 | 8/2011 | Kellock et al. |
| 8,026,436 B2 | 9/2011 | Hufford |
| 8,068,107 B2 | 11/2011 | Pirchio |
| 8,269,093 B2 | 9/2012 | Naik et al. |
| 8,381,086 B2 | 2/2013 | Li et al. |
| 8,521,533 B1 | 8/2013 | Ostermann et al. |
| 8,591,332 B1 | 11/2013 | Bright et al. |
| 8,606,384 B2 | 12/2013 | Kemp et al. |
| 9,032,301 B2 | 5/2015 | Harris et al. |
| 10,231,033 B1 * | 3/2019 | Bumgarner .......... H04N 21/242 |
| 2001/0015121 A1 | 8/2001 | Okamura et al. |
| 2001/0043219 A1 | 11/2001 | Robotham et al. |
| 2002/0193895 A1 | 12/2002 | Qian et al. |
| 2004/0027979 A1 | 2/2004 | Kawashima et al. |
| 2004/0264917 A1 | 12/2004 | Braun et al. |
| 2005/0054440 A1 | 3/2005 | Anderson et al. |
| 2005/0070241 A1 | 3/2005 | Northcutt et al. |
| 2006/0020880 A1 | 1/2006 | Chen |
| 2006/0152678 A1 | 7/2006 | Hung et al. |
| 2007/0208571 A1 | 9/2007 | Lemieux |
| 2008/0150948 A1 | 1/2008 | Annunziata |
| 2008/0215979 A1 | 9/2008 | Clifton et al. |
| 2009/0063159 A1 | 3/2009 | Crockett |
| 2009/0083541 A1 | 3/2009 | Levine |
| 2010/0118033 A1 | 5/2010 | Faria |
| 2010/0134501 A1 | 6/2010 | Lowe et al. |
| 2010/0178036 A1 | 7/2010 | Heinmiller et al. |
| 2011/0010624 A1 | 1/2011 | Vanslette et al. |
| 2011/0053131 A1 | 3/2011 | Regnier et al. |
| 2012/0102078 A1 | 4/2012 | Flick et al. |
| 2012/0170914 A1 | 7/2012 | Brahms et al. |
| 2012/0234160 A1 | 9/2012 | Khoo et al. |
| 2013/0211826 A1 | 8/2013 | Mannby |
| 2015/0332678 A1 * | 11/2015 | Cheatham, III ........ G09F 27/00 704/500 |
| 2016/0365126 A1 * | 12/2016 | Dalimba ............ G11B 27/3081 |

\* cited by examiner

SYSTEM AND METHOD FOR SYNCHRONIZATION OF MESSAGES AND EVENTS WITH A VARIABLE RATE TIMELINE UNDERGOING PROCESSING DELAY IN ENVIRONMENTS WITH INCONSISTENT FRAMERATES

RELATED APPLICATIONS

This application claims the benefit of U.S. Provisional Application Ser. No. 62/211,667, filed Aug. 28, 2015, entitled A SYSTEM AND METHOD FOR SYNCHRONIZATION OF MESSAGES AND EVENTS WITH A VARIABLE RATE TIMELINE UNDERGOING PROCESSING DELAY IN ENVIRONMENTS WITH INCONSISTENT FRAMERATES, the entire disclosure of which is herein incorporated by reference.

FIELD OF THE INVENTION

The present disclosure relates to a method for synchronization of a sequence of data with temporal information (a timeline, e.g. that of audio or video), with events or messages that occur in interactive media or applications, such as computer games. In particular, a user can delay the processing of synchronized events or messages in a flexible manner to maintain synchronization with a timeline experiencing playback delay. The source of this delay can be either internal or external to the interactive media or application.

BACKGROUND OF THE INVENTION

Interactive media, an example being game software, can run on multiple devices with multiple hardware and/or software configurations. Consider a scenario wherein a complex game software is run on a mobile phone and attempts to precisely synchronize a visual effect with a specific moment in an audio timeline (e.g. a specific cymbal crash in music). The game application, running in a software environment that contains an Operating System (OS), will ask the OS to play back some audio, generally through some standard Application Programming Interface (API). To the game software, the API is a blackbox system: the game software has little to no knowledge of what goes on internally. The game software will pass some audio data to the OS via the API, thereby moving the audio timeline position. This data may be stored by the OS in its own internal buffers. This allows the OS to perform some extra processing on the audio data before the data actually reaches the speakers. This may introduce a consistent delay between when the audio data is last "seen" by the game software and when the user actually hears the audio data from the device's speaker. This delay can be egregious, and make it generally impossible for the game software to convincingly synchronize events, messages, visuals, etc. to the audio.

In another related scenario, hardware differences between mobile devices upon which an interactive media application may be run could imply a different or added delay. Differences in component speed, available component memory, or connected components (software, hardware, etc.) could change the amount of audio buffered by the device's Operating System, the amount of distance audio data must travel, and the speed at which the audio data can travel. Such differences between hardware configurations may also cause variation in the amount of time it takes for audio to travel through the hardware and reach the speakers. Such a delay may be perceptible by the user.

SUMMARY OF THE INVENTION

The present application overcomes the shortcomings of the prior art with a system that handles the inconsistent processing of interactive media (e.g. game frames) and the generally consistent timeline delay to enable synchronization of messages and events with the playback of possibly variable-rate timelines. Generally, the user configures a time offset in the application that matches the delay introduced by a device. One example of this offset may be a value in milliseconds called delayTimeMS.

One aspect of the disclosure provides a method of synchronizing media, comprising: determining a frame time of at least one frame of the media; determining an amount of time a timeline associated with the media has progressed since the at least one frame; adding the determined frame time and the determined amount of time the timeline has progressed as a first entry in a timeline processing map; and adjusting the delivery of at least one message or event associated with the media based in part on the first entry of the timeline processing map.

In one example, the media comprises a video game.

In one example, the timeline associated with the media comprises an audio file.

In one example, the at least one message or event associated with the media causes visual content to be displayed to a user via a display.

In one example, the at least one message or event associated with the media causes audio content to be played to a user via an audio device.

In one example, the audio device comprises at least one of: a speaker or headphones.

In one example, adjusting the delivery of at least one message or event results in delay or visual content display to a user or audio content played for a user.

In one example, the method further includes: determining a second frame time of a second frame of the media; determining a second amount of time the timeline associated with the media has progressed since the second frame; and adding the second determined frame time and the second determined amount of time the timeline has progressed as second entry in the timeline processing map.

In one example, the method further includes: comparing the second frame time with the first entry and adjusting the first entry based on the comparison.

Another aspect of the disclosure provides a non-transitory computer readable medium containing program instructions for synchronizing media, wherein execution of the program instructions by one or more processors of a computer system causes the one or more processors to perform operations comprising: determining a frame time of at least one frame of the media; determining an amount of time a timeline associated with the media has progressed since the at least one frame; adding the determined frame time and the determined amount of time the timeline has progressed as a first entry in a timeline processing map; and adjusting the delivery of at least one message or event associated with the media based in part on the first entry of the timeline processing map.

Another aspect of the disclosure provides a system for synchronizing media, comprising: a memory having computer executable instructions stored thereon; one or more processors that when executing the instructions are configured to: determine a frame time of at least one frame of the media; determine an amount of time a timeline associated with the media has progressed since the at least one frame; add the determined frame time and the determined amount of time the timeline has progressed as a first entry in a timeline processing map; adjust the delivery of at least one message or event associated with the media based in part on the first entry of the timeline processing map.

BRIEF DESCRIPTION OF THE DRAWINGS

The invention description below refers to the accompanying drawings, of which.

DETAILED DESCRIPTION

Figure 1:
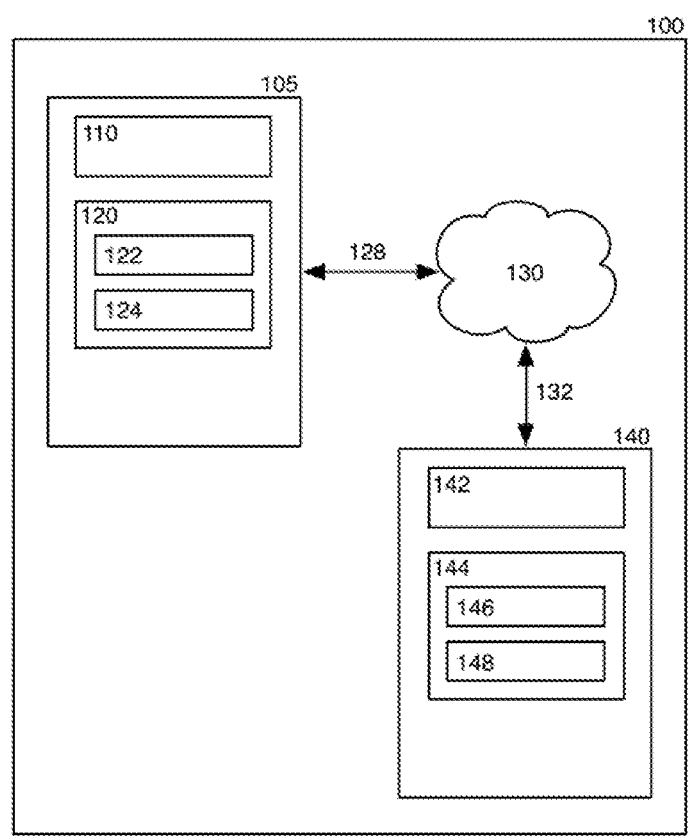
FIG. 1 is a block diagram showing a computing system according to one or more aspects of the disclosure.

FIG. 1 is a block diagram showing a computing system 100 according to one or more aspects of the disclosure. As shown, the system 100 can include a computing device 105. The computing device 105 can be any type of computing device, such as a personal computer, laptop computer, mobile device, tablet computer, etc. As shown, the computing device 105 can include a processor 110, a memory 120, and any other components typically present in general purpose computers. The memory 120 can be a tangible non-transitory computer-readable medium and can store information accessible by the processor 110, such as program instructions 122 that may be retrieved and executed by the processor and/or data 124 that may be retrieved, manipulated, or stored by the processor 110 or any other component of the computing device 105. The processor 110 can be any type of processor, such as a processor manufactured or designed by Intel®, AMD®, or ARM®. The memory 120 can be any type of memory, such as volatile or non-volatile types of memory. In particular, the memory can include one or more of the following: ROM, such as Mask ROM, PROM, EPROM, EEPROM; NVRAM, such as Flash memory; Early stage NVRAM, such as nvSRAM, FeRAM, MRAM, or PRAM, or any other type, such as, CBRAM, SONOS, RRAM, Racetrack memory, NRAM, Millipede memory, or FJG. Any of the methods, routines, procedures, steps, blocks, etc., discussed herein in the present disclosure can be implemented as a set of program instructions stored in the memory 120, such that, when executed by the processor 110, can cause the processor 110 to perform the corresponding method, routine, procedure, step, block, etc.

Although depicted as single elements in FIG. 1, the processor 110 and memory 120 can respectively comprise one or more processors and/or memory elements that can communicate by a wired/wireless connection. In this regard, the processor 110 can comprise a plurality of processors that can cooperate to execute program instructions. Moreover, the memory 120 can comprise a plurality of memories that can cooperate to store instructions and/or data.

The computing device 105 can also accept user input according to a number of methods, such as by a mouse, keyboard, trackpad, touchscreen interface, or the like (not shown). The computing device 105 can also be operably connected to a display (not shown). The computing device 105 can also provide output according to a number of methods, such as visual output by a display (such as a LCD display) or audio output (by speakers and/or headphones).

The computing device 105 can also include one or more components to allow for wired or wireless communication via link 128 with any other computing device, such as server cloud 130 or computing device 140. The server cloud 130 can comprise one or more server computing devices, where such server computing devices can include similar components to those set forth with respect to device 105. Similarly, computing device 140 can include a processor 142, memory 144, instructions 146, and data 148, similar to the features set forth with respect to device 105 and can be connected directly or indirectly to computing device 105 via link 132 and server cloud 130.

Figure 2:
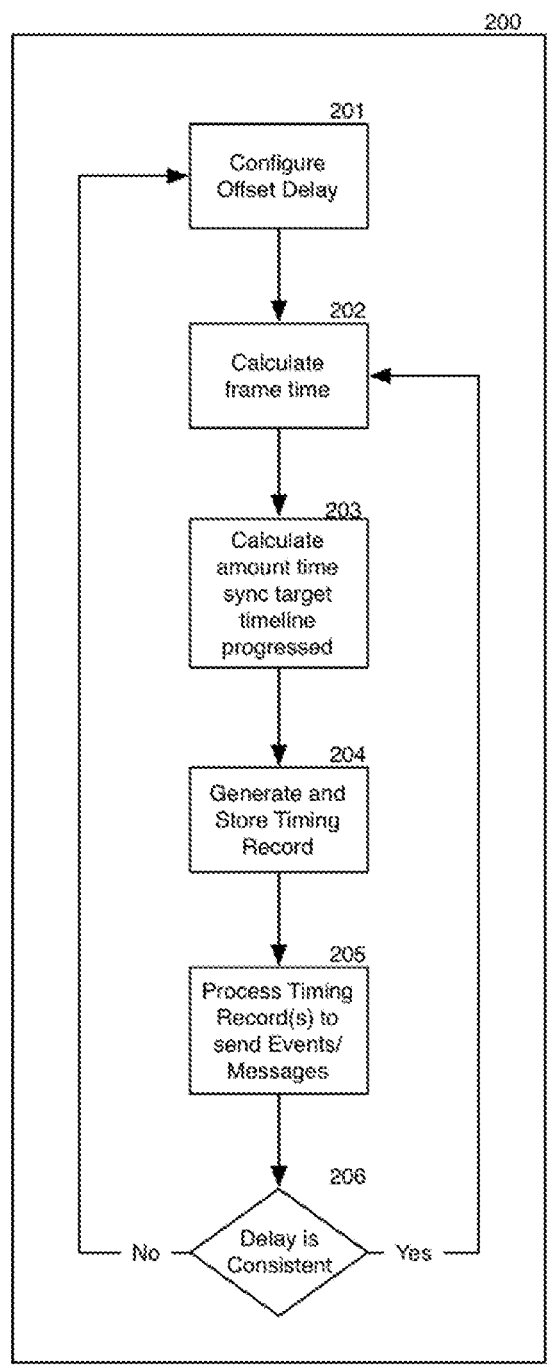
FIG. 2 is a flow chart depicting an overview of the system and method according to one or more aspects of the disclosure.

FIG. 2 is a flow chart depicting an overview of the system and method according to one or more aspects of the disclosure. At block 201, a delay offset value is configured e.g. by a programmer based on experience with the computing device hardware and/or software, a user of the interactive application during a configuration step, or possibly by a separate delay detection process. At block 202, the amount of time it took to process the previous frame of interactive media is calculated and stored. At block 203, the amount of time the synchronization target timeline progressed is calculated and stored. As used herein, synchronization target timeline, also referred to as timeline, can include an audio file, a video file, an animation file, a recorded series of steps over time, or any other chronological series of events. At block 204, a timing record that makes use of info generated in block 201, 202, and 203 is generated and added as a first entry in a timeline processing map. At block 205, the timing records stored in the timeline processing map are processed with respect to timing information for the current frame. The delayed timing of the synchronization target timeline is thus calculated and used to send events/messages to systems attempting to synchronize with the target timeline. At 206, if the delay is consistent the present process will continue in the next frame with the previously configured offset. At 206, if the delay is inconsistent, the delay will be revisited prior to the next iteration of the process.

As mentioned above, the present application overcomes the shortcomings of the prior art with a system that handles the inconsistent processing of media (e.g. multimedia, interactive media, digital games, music visualization software, video playback software, animation software, etc.) and the generally consistent timeline delay to enable synchronization of messages and events with the playback of potentially variable-rate timelines. Generally, the user configures and/or adjusts a delay offset value, as described with respect to block 201, in the application that matches the delay introduced by a device. One example of this offset may be a value in milliseconds called delayTimeMS.

It is possible that the consistent delay may fluctuate in certain hardware/software environments. Where this delay is measurable by the game software, the delay is automatically configured and updated at regular intervals (e.g. once per processing frame or at an otherwise configurable rate). Where this fluctuating delay isn't automatically detectable, the game software may use heuristics from attached input devices (e.g. keyboards, microphones, mouses, game controllers, accelerometers) to adjust this delay.

Figure 3:
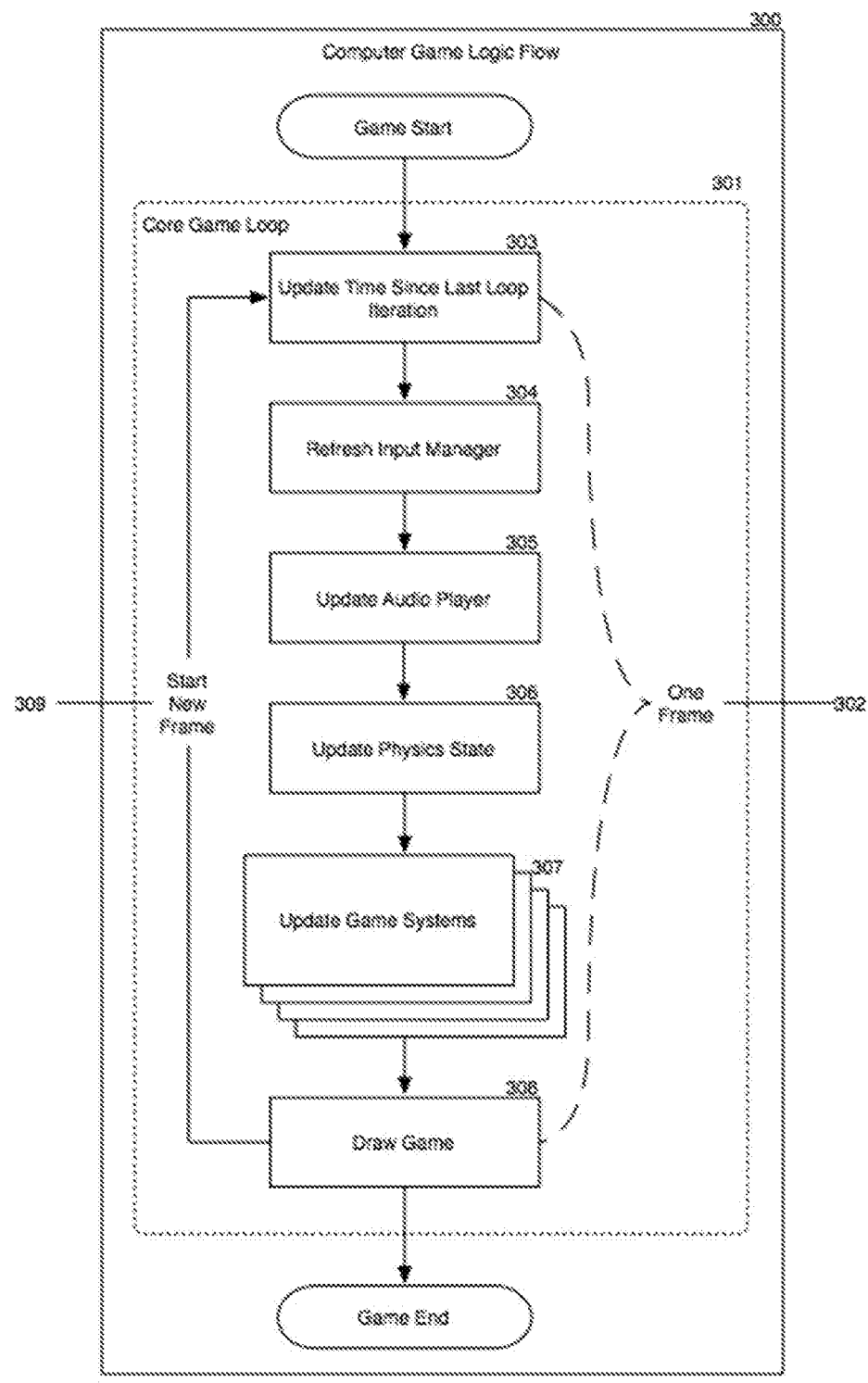
FIG. 3 is a diagram depicting an example of a core loop of a computer game.

In one example, the interactive media may be game software. FIG. 3 is a diagram depicting an example of a core loop 301 of a computer game. Games processing is broken up into "frames," much like animation. Each iteration of the core loop is considered a single frame 302. The core loop processing may start with comparing the current time to the time of the beginning of the previous frame 303. This difference in time is generally called deltaTime and is used by systems throughout the processing of a frame as will be discussed below.

The game may then refresh the input state 304, for example through an input manager system. The input manager may query connected devices such as keyboard, mice, controllers, touch panels, etc. to detect any changes to input that further systems may depend upon.

The game may then refresh the audio state 305 through an audio player module. This system may refill audio buffers as requested by an audio driver, update volume, load/unload an audio file, etc. In one example, an audio file represents the synchronization target timeline. When the application updates the audio player in this step, it updates the playback position of the audio file and this information may be used to calculate the amount of time the synchronization target timeline progressed as described in block 203. The audio data itself may experience a delay before reaching the speakers and thus become audible to the user. If another system in the application attempted to produce visuals based on the raw playback position of the target synchronization timeline audio file, then the visuals may appear out of sync with the delayed audio: they may be displayed before the audio reaches the speakers. The present application overcomes the shortcomings of the prior art by delaying events and/or messages sent to other systems, such as the one producing visuals. Events and/or messages can include any type of function call or function call plus additional data sent or transmitted from one system to another system within an application or one subcomponent of a computer system to another subcomponent of the same or different computer, such as a function call to display predetermined visual content at the display of a user at a predetermined time and/or play a predetermined portion of an audio file from the headphones and/or speakers of a user viewing the visual content at a predetermined time. Events and/or messages can also include function calls or functional calls plus additional data sent from one computer system to another, such as via a wired or wireless internet or network connection. Timing records are stored in a timeline processing map that details the precise playback history of the audio file. At a later processing step, this history is processed relative to a configured delay, and the messages/events are sent in accordance with the revised timing information. In that way a user will view the visual content and hear the associated content properly synchronized.

The game may then refresh the physics state 306. This may move game objects around within a level or trigger physics events such as collision events.

The game may then continue to update game systems 307 such as player control, enemy AI, player and enemy health, weapon systems, etc. These systems may perform calculations that depend on input, messages, or state of previously updated systems such as the deltaTime, the audio state, the input state, or physics state.

The game may then draw the current state of all visible objects to the display 308, which is what the player of the game will actually see.

If specific input was received to cause the game to end, the game may end. In the absence of such an event, however, the core game loop will iterate, beginning the processing of a new frame 309 at which point this process repeats.

The game frames discussed above can take a variable amount of time to process. In a game software run in an environment experiencing an egregious delay of audio such as 100 ms or greater, synchronization with an audio timeline based on the playback position of the timeline may be impossible using conventional techniques of the prior art.

Figure 4:
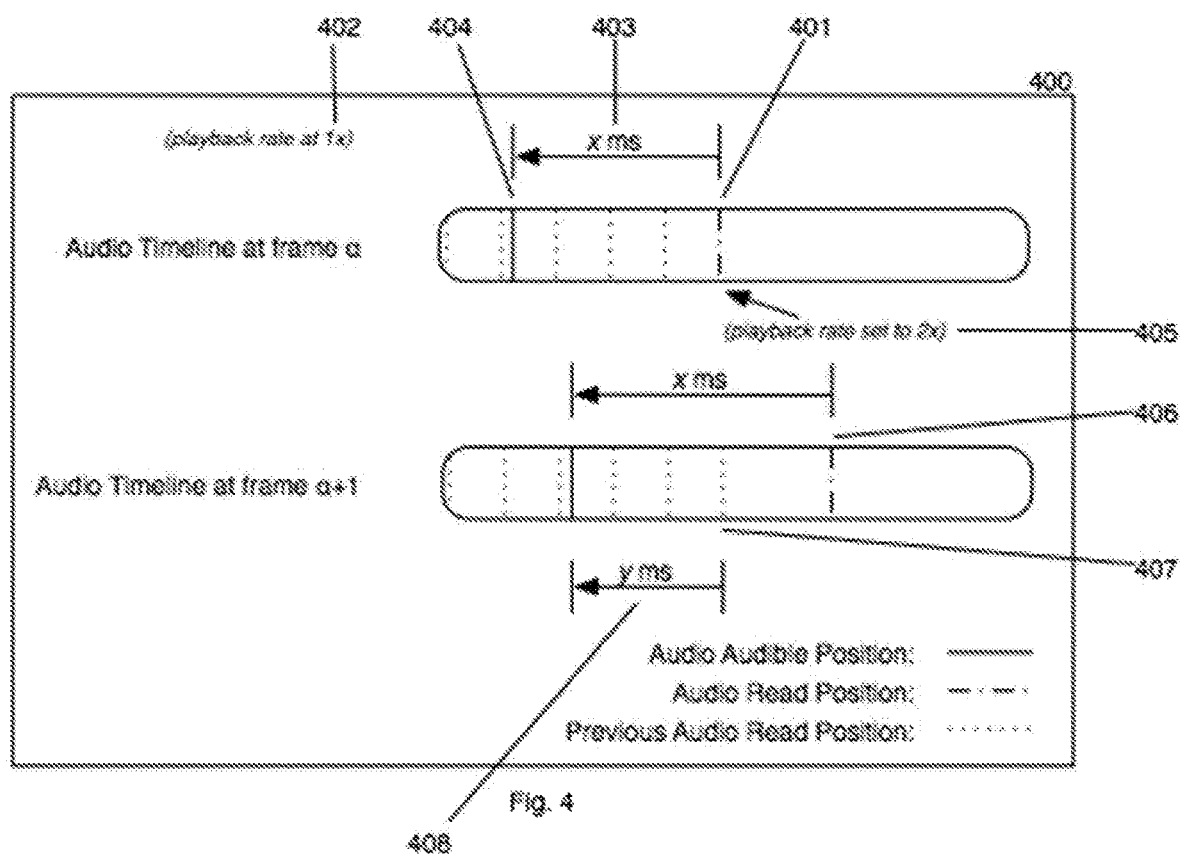
FIG. 4 is a diagram depicting the difference between the position of the audio according to the game and the position of the audio that is actually audible.

FIG. 4 is a diagram depicting the difference between the position of the audio according to the game and the position of the audio that is actually audible. The current read position 401 of the audio playing back at normal speed (1x) 402 according to the game logic may be x-milliseconds 403 ahead of the current audible audio position 404. Therefore, in order to properly synchronize events at runtime, the actions that a game developer wants to synchronize to the music must be delayed by x-milliseconds to actually occur at the time the audio can be heard. It should be noted that the x-milliseconds of delay time may be longer than the time it takes to process one or more frames of the game.

In some game software, it is advantageous to change the playback speed of the audio. In one example, the player may gain a speed boost, and the designer has programmed the game software to increase the audio speed to match the player speed (or vice versa). This scenario further complicates matters because the timing of changes to the audio playback speed in environments undergoing delay do themselves undergo delay: the speed change itself will take x-milliseconds to reach the speakers and become audible. In one example, the speed change (e.g., 2x speed 405) is abrupt (occurs in a single game processing frame) and speeds up the audio such that the audio read position of the next frame 406 is further ahead than if it had not been changed. In the example depicted in FIG. 4, the timing of the change to 2x speed 407 is now y-milliseconds 408 away from actually being audible. The audio data reaching the speakers is still playing at 1x speed while the speed of the audio according to the now current read position 406 is 2x. In another example, the speed increase occurs over an indeterminate amount of time and may extend across multiple game processing frames. In this case, the perceptual delay between tracked playhead position and audible music may fluctuate.

The present application addresses each of these scenarios by introducing a specific timeline processing map (history) that captures the rate at which a timeline position progresses with respect to the speed at which the media application (e.g., multimedia application or interactive media application) is processed. Future processing passes can inspect the map to reconstruct the actual position of the delayed timeline.

In one example, the interactive media may be game software and the synchronization target timeline may be an audio file. With reference to FIG. 2, when the game logic begins the processing of a new frame, the delay handling system records the deltaTime (e.g. frame time) which is calculated at block 202 of the frame and the amount of time that the audio has progressed since the previous frame 203 and adds it as a timing record entry to a timeline processing map 204.

Figure 5:
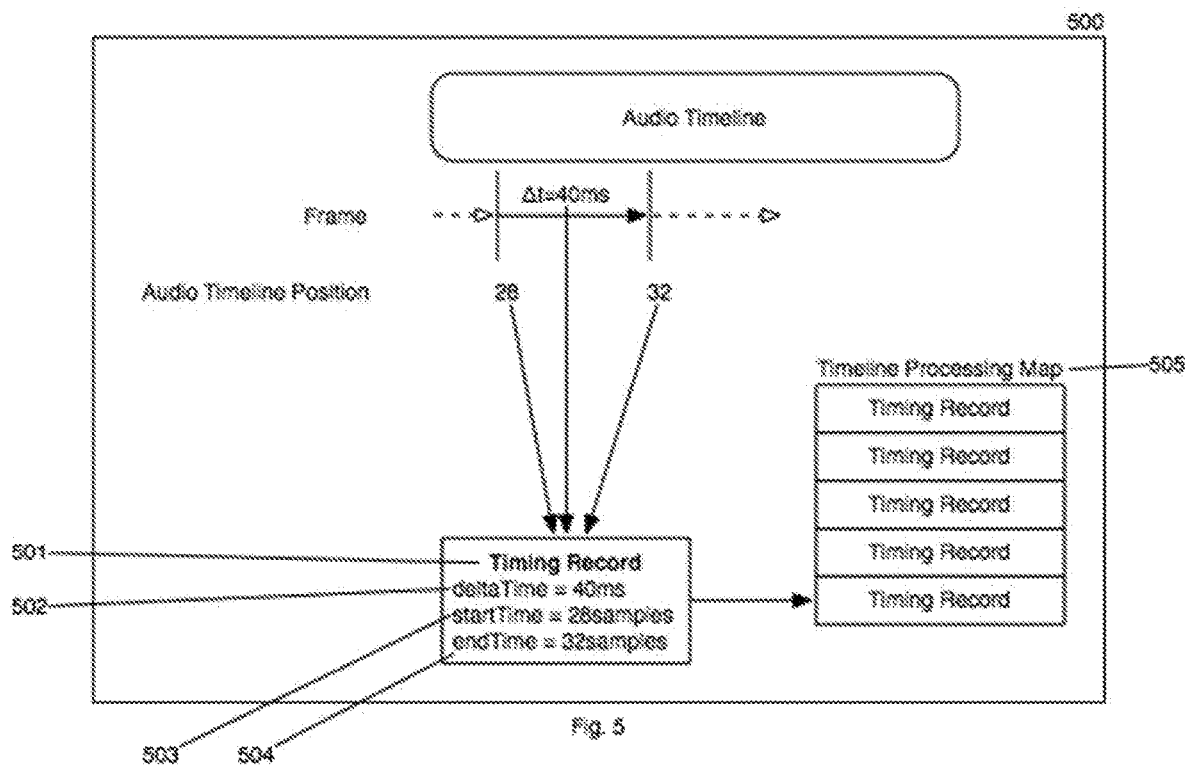
FIG. 5 is a diagram depicting generating one entry of an example of a timing record and adding it to a timeline processing map.

FIG. 5 is a diagram depicting generating one entry of an example of a timing record and adding it to a timeline processing map. In this example, the timing record 501 stores deltaTime and the amount of time the audio has progressed since the previous frame. The deltaTime is stored directly as the deltaTime 502. The amount of time the audio has progressed since the previous frame is stored as the startTime 503 of the audio position at the beginning of the deltaTime 502 and the endTime 504 of the audio position at the end of the deltaTime 502. This timing record is then added to a timeline processing map 505, which is a chronological listing of timing records. Some timing records may have been generated on previous frames. These audio positions may be expressed in samples and the audio delta can be calculated by taking the difference of these values, rather than storing it directly. This captures audio speed changes by maintaining the processing time of the game frame separately from the amount of time the audio timeline moved: comparing the two (perhaps after converting the sample time of the audio timeline into the seconds time of the deltaTime via well-known methods) would show their relative speeds. This information (and, in some examples, a timestamp of the frame) is stored in the timeline processing map.

Figure 6:
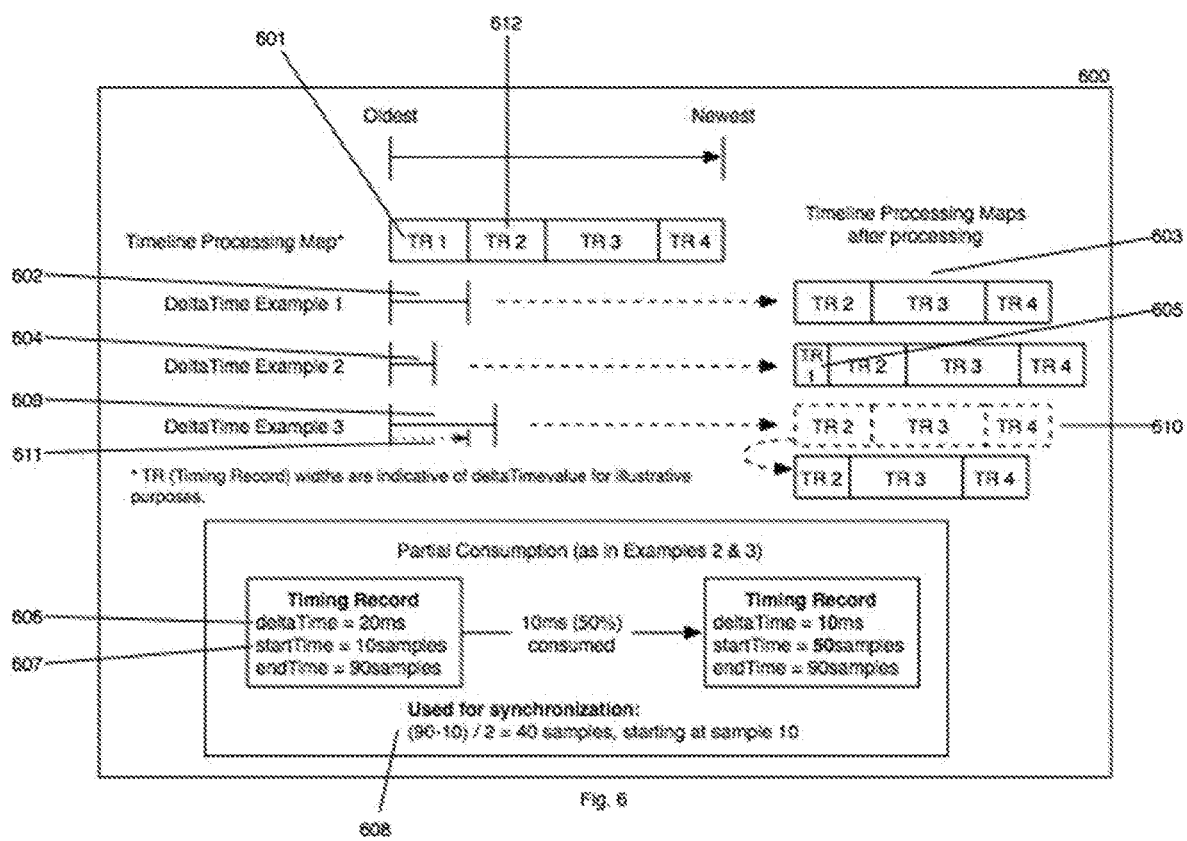
FIG. 6 is a diagram depicting comparing the first entry (the oldest entry in the list) to the deltaTime of the current frame.

At a later processing step 205, as mentioned above timing records may be processed to send events/messages. This may include inspecting the timeline processing map and comparing the first entry (the oldest entry in the list) to the deltaTime of the current frame. This comparison is depicted in the diagram in FIG. 6 and results in one of three of the following scenarios:

1. The deltaTime associated with the first entry 601 in the timeline processing map matches that of the current frame 602. The first entry 601 is removed from the timeline processing map 603 and its audio data timing information (along with the deltaTime 602) is used to send messages and/or events for synchronization (e.g. to systems configured to produce visuals, play back other audio files, begin or update animations, etc. in concert with the audio file). It should be noted that the first entry could describe the current frame of processing. This may occur, for example, in situations undergoing zero delay.

2. The deltaTime associated with the first entry 601 is greater than that of the current frame 604. The first entry 601 is updated in the timeline processing map 605 by reducing the stored deltaTime 606 by the deltaTime of the current frame 604 and adjusting the audio startTime 607 by a commensurate amount of time of audio data 608. This commensurate amount of time of audio data 608 (along with the deltaTime 604) is used to send messages and/or events for synchronization.

3. The deltaTime associated with the first entry 601 is less than that of the current frame 609. The first entry is removed from the timeline processing map 610 and its audio data timing information (along with the commensurate amount of deltaTime 611) is used for synchronization. The system then subtracts the first entry's deltaTime 611 from the current frame's deltaTime value 609, and inspects the second entry 612 with this same set of steps.

The timeline processing map is processed in a manner related to the configured offset delay. In one example, a special timing record with deltaTime set to the configured offset delay and no synchronization target timeline timing information is first added to the beginning of the timeline processing map. When this first timing record is processed, no events or messages are sent but subsequent timing records can be seen to be delayed by the configured offset delay.

In one example, if the configured offset delay is adjusted with a timeline processing map already in place (a timeline already playing), the stored frame time of the oldest timing record(s) in the timeline processing map is (are) adjusted according to the difference between the previous configured offset delay and the newly configured offset delay: the values are reduced by the amount that the new delay is smaller than the old delay or, similarly, increased by the amount that the new delay is larger than the old delay.

In another example, if the configured offset delay is adjusted with a timeline processing map already in place (a timeline already playing), a new timeline processing map may be generated alongside the existing one. A special timing record with no synchronization target timeline timing information is added as in the above and newly generated records are added to this timeline processing map instead of the previously existing one. Both timeline processing maps are then processed, with the previously existing one receiving no further records and, thus, going away after all records are processed.

Figure 7:
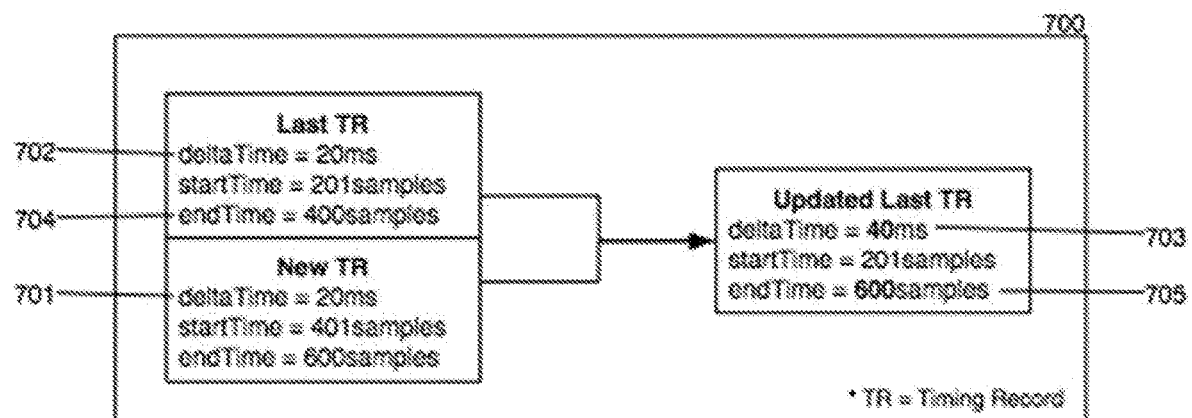
FIG. 7 is a diagram depicting combining entries of a timeline processing map.

The entries of this map may also be combined. One example of this is depicted in the diagram of FIG. 7. If the playback speed at the time of recording is the same as that of the previous entry in the list, then the deltaTime of the current frame 701 may be added to the stored deltaTime of the previous entry in the list 702 for a combined total 703. The endTime of the previous entry 704 is also updated based upon how far the timeline progressed since the previous frame 705. If the timeline position of the current frame is not contiguous with the endTime of the previous entry in the list (e.g. if the timeline position was seeked or, in some examples, looped), then a new entry is generated and the process will repeat for the following frame.

Figure 8:
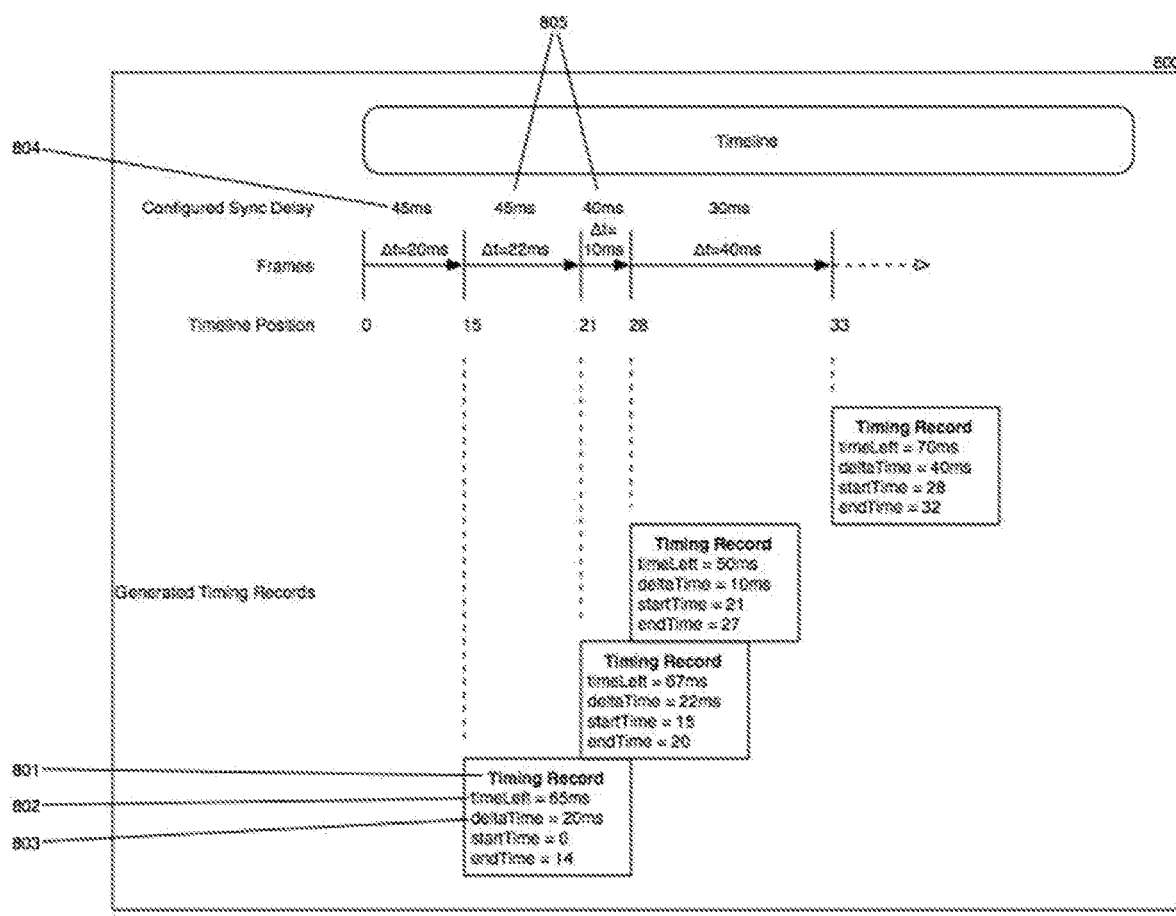
FIG. 8 is a diagram depicting one example in which another value is stored in a timing record.

FIG. 8 is a diagram depicting one example in which another value is stored in a timing record 801: timeLeft 802=deltaTime 803+current delay offset 804. In this example, the configured delay for the current frame pass 804 is thus stored in the timing record 801, ensuring stability even when the configured delay differs between processing frames 805. Values in FIG. 8 are shown at storing time and are not shown to be processed as described below.

Figure 9:
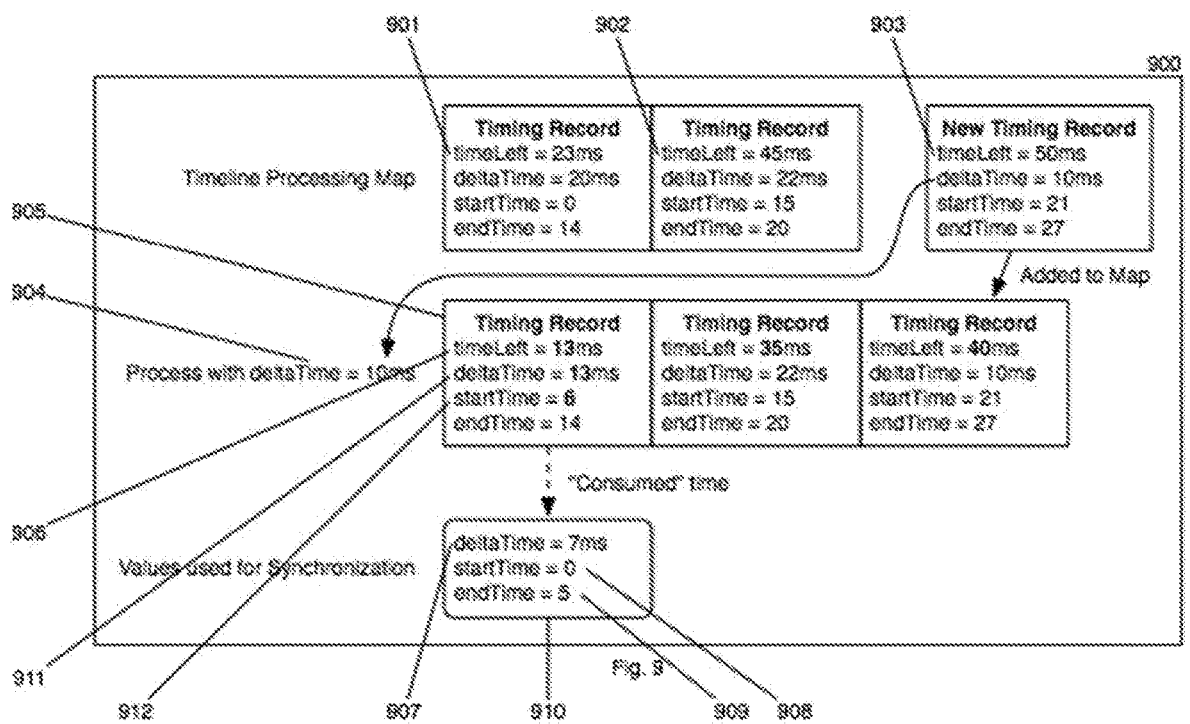
FIG. 9 is a diagram depicting a variation of the processing block 205 described in FIG. 2.

FIG. 9 is a diagram depicting a variation of the processing step 205 that involves the timing record example described above. In this example, all records are processed in the same pass, with their timeLeft value 901, 902, 903 being reduced by the current frame time 904. When the timeLeft value of an entry drops below the stored deltaTime value as occurs when processing the oldest timing record 905, processing for synchronization can occur. If timeLeft is reduced to zero, the record is removed from the timeline processing map and its timeline timing information is used in conjunction with its stored deltaTime value for synchronization. If, however, the timeLeft value is greater than zero 906, the difference in time between timeLeft and deltaTime 907, as well as a commensurate amount of the stored timeline position time 908, 909, is used to process synchronization tasks 910. The record's deltaTime and timeline position values are then updated to reflect the amount of time that has not been "consumed" during this processing pass: stored deltaTime 911=timeLeft; timeline startTime 912=startTime+[amount of timeline time just processed]. In this case, the record is left in the map for the next processing pass (frame).

Figure 10:
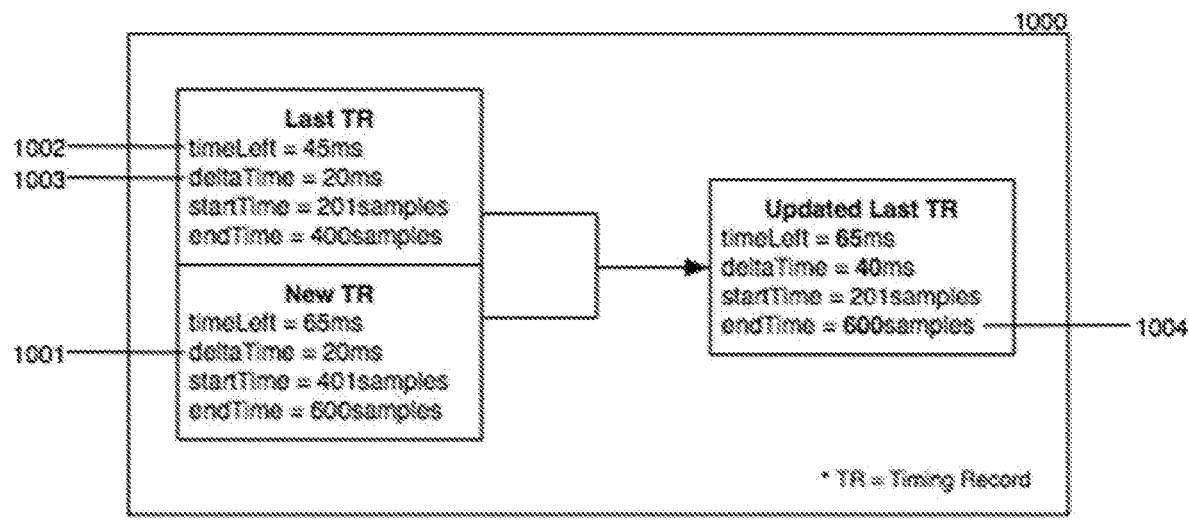
FIG. 10 is a diagram depicting combining entries of a timeline processing map.

Timing records stored in this manner may also be combined, similar to the previously outlined method, as depicted in the diagram of FIG. 10. With records that contain a timeLeft field, the deltaTime 1001 is added to both the timeLeft 1002 and deltaTime 1003 of the previous timing record. The endTime 1004 is updated as in the previous example. Similar to the previous example, if the timeline position is not contiguous between entries, a new entry is generated. An extra check may also be instituted for the configured sync delay: if the sync delay of the previous frame does not match that of the current frame then a new entry is generated, even if the timeline playback is contiguous with the previous frame. In this way tracking of the dynamic sync delay is maintained.

Figure 11:
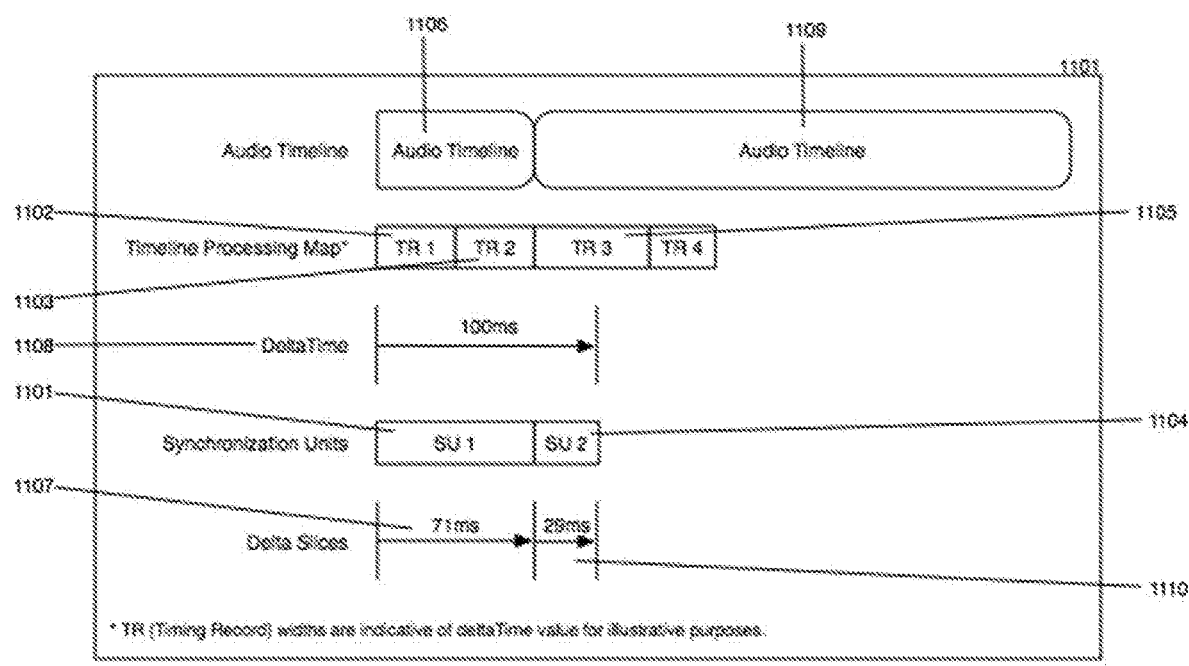
FIG. 11 is a diagram depicting synchronization units.

In one example, an intermediary step may occur during the processing of the list of timing record entries in which all processed/used records or portions of records are combined into larger "synchronization units", each unit representing a continuous amount of the target timeline to synchronize to. A few examples of reasons to break into multiple synchronization units may be if a timeline changed (audio track change), a timeline was seeked (audio time jump), a timeline reached an end and started over (looped), or if a timeline was reversed ("play" in reverse). In an example depicted in the diagram of FIG. 11, a first synchronization unit 1101 may collect information from two timing records 1102, 1103 while a second synchronization unit 1104 would collect information from one timing record 1105. The first synchronization unit may make up the last x-milliseconds of a timeline 1106. This synchronization unit would be processed with information representing a first slice 1107, or specific portion, of the current deltaTime 1108, allowing synchronizing systems to understand that the portion of the timeline 1106 being synchronized to represents an "earlier portion" of the current frame's deltaTime 1108. The second synchronization unit 1104 would make up the first y-milliseconds of a timeline 1109. This synchronization unit would be processed with information representing a second slice 1110 of the current deltaTime 1108, allowing synchronizing systems to understand that the portion of the timeline being synchronized to represents a "later portion" of the current frame's deltaTime. This enables synchronization processing to remain precise even when changes to timeline playback occur in the middle of a processing frame.

In this way, a game can record the rate at which the playback of a timeline undergoing delay progresses and delay any processing that should be synchronized to the target timeline, even in an environment with variable playback rate of the timeline and a volatile framerate (both at record and synchronization processing times).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A method of synchronizing media, comprising:
   determining a frame time of at least one frame of the media;
   determining an amount of time a timeline associated with the media has progressed since the at least one frame;
   adding the determined frame time and the determined amount of time the timeline has progressed as a first entry in a timeline processing map, the timeline processing map comprising a chronological listing of timing records; and
   adjusting the delivery of at least one message or event associated with the media based in part on at least one delay offset time and in part on the first entry of the timeline processing map.

2. The method as set forth in claim 1, wherein the media comprises a video game.

3. The method as set forth in claim 1, wherein the timeline associated with the media comprises an audio file.

4. The method as set forth in claim 1, wherein the at least one message or event associated with the media causes visual content to be displayed to a user via a display.

5. The method as set forth in claim 1, wherein the at least one message or event associated with the media causes audio content to be played to a user via an audio device.

6. The method as set forth in claim 5, wherein the audio device comprises at least one of: a speaker or headphones.

7. The method as set forth in claim 1, wherein adjusting the delivery of at least one message or event results in delay of visual content displayed to a user or audio content played for a user.

8. The method as set forth in claim 1, further comprising:
   determining a second frame time of a second frame of the media;
   determining a second amount of time the timeline associated with the media has progressed since the second frame; and
   adding the second determined frame time and the second determined amount of time the timeline has progressed as a second entry in the timeline processing map.

9. The method as set forth in claim 8, further comprising:
   comparing the second frame time with the first entry and adjusting the first entry based on the comparison.

10. The method as set forth in claim 1, wherein the first entry comprises a first timing record of the chronological listing of timing records.

11. The method as set forth in claim 1, wherein at least some of the chronological listing of timing records comprises a timing record generated from a previous frame.

12. The method as set forth in claim 1, further comprising determining the at least one delay offset time.

13. The method as set forth in claim 12, wherein determining the at least one delay offset time comprises a delay detection process.

14. A non-transitory computer readable medium containing program instructions for synchronizing media, wherein execution of the program instructions by one or more processors of a computer system causes the one or more processors to perform operations comprising:
   determining a frame time of at least one frame of the media;
   determining an amount of time a timeline associated with the media has progressed since the at least one frame;
   adding the determined frame time and the determined amount of time the timeline has progressed as a first entry in a timeline processing map, the timeline processing map comprising a chronological listing of timing records; and adjusting the delivery of at least one message or event associated with the media based in part on at least one delay offset time and in part on the first entry of the timeline processing map.

15. A system for synchronizing media, comprising:

a memory having computer executable instructions stored thereon;

one or more processors that when executing the instructions are configured to:

determine a frame time of at least one frame of the media;

determine an amount of time a timeline associated with the media has progressed since the at least one frame;

add the determined frame time and the determined amount of time the timeline has progressed as a first entry in a timeline processing map, the timeline processing map comprising a chronological listing of timing records; and adjust the delivery of at least one message or event associated with the media based in part on at least one delay offset time and in part on the first entry of the timeline processing map.

\* \* \* \* \*